US011936098B2

(12) United States Patent
Ling et al.

(10) Patent No.: US 11,936,098 B2
(45) Date of Patent: Mar. 19, 2024

(54) ANTENNA STRUCTURE AND WIRELESS COMMUNICATION DEVICE

(71) Applicant: REALTEK SEMICONDUCTOR CORPORATION, Hsinchu (TW)

(72) Inventors: Ching-Wei Ling, Hsinchu (TW); Chih-Pao Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 31 days.

(21) Appl. No.: 17/549,344

(22) Filed: Dec. 13, 2021

(65) Prior Publication Data

US 2023/0058737 A1 Feb. 23, 2023

(30) Foreign Application Priority Data

Aug. 23, 2021 (TW) ................................ 110131145

(51) Int. Cl.
*H01Q 1/24* (2006.01)
*H01Q 1/52* (2006.01)
*H01Q 9/04* (2006.01)

(52) U.S. Cl.
CPC ............. *H01Q 1/243* (2013.01); *H01Q 1/521* (2013.01); *H01Q 9/0421* (2013.01)

(58) Field of Classification Search
CPC .. H01Q 1/24; H01Q 1/52; H01Q 9/04; H01Q 1/243; H01Q 1/48; H01Q 1/521-523; H01Q 9/0421
See application file for complete search history.

(56) References Cited

U.S. PATENT DOCUMENTS

| | | | | |
|---|---|---|---|---|
| 7,450,072 B2 * | 11/2008 | Kim | H01Q 1/243 343/846 |
| 8,937,578 B2 * | 1/2015 | Montgomery | H01Q 5/40 343/702 |
| 2008/0278405 A1 * | 11/2008 | Montgomery | H01Q 1/243 343/893 |
| 2011/0050528 A1 * | 3/2011 | Montgomery | H01Q 9/42 343/795 |
| 2013/0222186 A1 | 8/2013 | Leung et al. | |

FOREIGN PATENT DOCUMENTS

| | | |
|---|---|---|
| EP | 2499702 B1 | 8/2014 |
| EP | 2504884 B1 | 11/2018 |
| TW | I675507 B | 10/2019 |
| TW | I708428 B | 10/2020 |

OTHER PUBLICATIONS

English abstract of TWI675507B and TWI708428B.

* cited by examiner

*Primary Examiner* — Hasan Islam
(74) *Attorney, Agent, or Firm* — WPAT, P.C.; Anthony King

(57) ABSTRACT

An antenna structure includes a first resonant unit and a second resonant unit. The first resonant unit is configured to transmit an input signal as a first wireless signal. The second resonant unit is configured to transmit the input signal as a second wireless signal. The first resonant unit and the second resonant unit have a substantially identical operating band, and the first resonant unit and the second resonant unit are a single continuous metal structure.

17 Claims, 9 Drawing Sheets

ANTENNA STRUCTURE AND WIRELESS COMMUNICATION DEVICE

CROSS-REFERENCE TO RELATED APPLICATIONS

This application claims the benefit of priority to Patent Application No. 110131145, filed in Taiwan on Aug. 23, 2021, which is incorporated by reference in its entirety.

TECHNICAL FIELD

The present application relates to an antenna structure and a wireless communication device in particular, to a planar antenna structure and a related wireless communication device.

BACKGROUND

In wireless communication, the radiation pattern of the antenna has a null, so that a single antenna has a lower radiation efficiency at the null of the radiation pattern. In order to transmit (or receive) signals more effectively in all directions, wireless communication devices are equipped with multiple antennas to cover all directions. However, multiple antennae occupy more area and are obviously a limitation for increasingly thin and short electronic devices.

SUMMARY OF THE INVENTION

An aspect of the present disclosure provides an antenna structure. The antenna structure includes a first resonant unit and a second resonant unit. The first resonant unit is configured to transmit an input signal as a first wireless signal. The second resonant unit is configured to transmit the input signal as a second wireless signal. The first resonant unit and the second resonant unit have substantially identical operating bands, and the first resonant unit and the second resonant unit are a single continuous metal structure.

Another aspect of the present disclosure provides a wireless communication device. The wireless communication device includes a circuit substrate. The circuit substrate includes an antenna structure configured to transmit an input signal as a first wireless signal or a second wireless signal. A first radiation pattern of the first wireless signal and a second radiation pattern of the second wireless signal are mirror-symmetrical, and the antenna structure is a planar symmetrically structure and a single continuous metal structure.

The antenna structure and the wireless communication device of the present disclosure use a single symmetrical antenna structure with a dual input point to generate symmetrical radiation patterns. The symmetrical radiation patterns mutually cover each other's receiving and transmitting dead sector. Compared to the conventional technology, the antenna structure and the wireless communication device of the present disclosure do not use additional wiring area, and also has omnidirectional transceiver capability.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
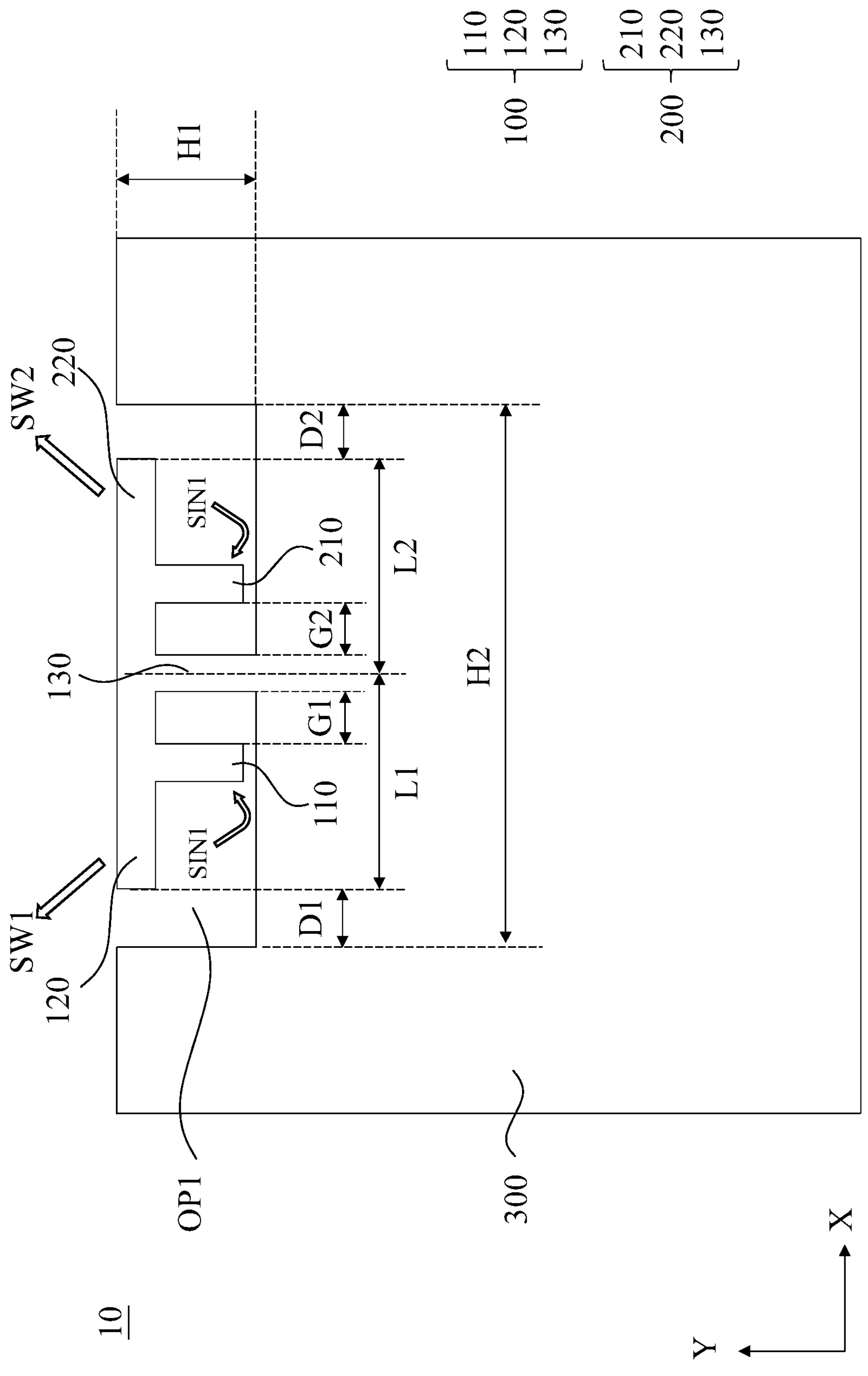
FIG. 1 is a schematic diagram illustrating an antenna structure according to some embodiments of the present application.

FIG. 1 is a schematic diagram illustrating an antenna structure 10 according to some embodiments of the present application. The antenna structure 10 is a planar single continuous metal structure. In certain embodiments, the antenna structure 10 is implemented using a printed circuit board. For example, the antenna structure 10 can be formed from the metal of the first conductive layer of a two layered printed circuit board. As could be appreciated, the present application is not limited to the above-mentioned embodiments, the antenna structure 10 is also suitable for use in a single layer or multi-layer circuit board, and the first conductive layer can be, for example, a top layer metal or a bottom layer metal.

The antenna structure 10 includes a resonant unit 100, a resonant unit 200 and a conductive plane 300. The conductive plane 300 has an opening OP1. The resonant unit 100 and the resonant unit 200 are disposed in the opening OP1. The resonant unit 100 and the resonant unit 200 are planar inverted-F antenna (PIFA) and symmetrically disposed. The resonant unit 100 and the resonant unit 200 share a portion of the conductive structure. Specifically, the resonant unit 100 includes an input pin 110, a radiation part 120 and a shorting pin 130, and the resonant unit 200 includes an input pin 210, a radiation part 220 and the shorting pin 130. In this case, the radiation part 120 extends along an X direction and connects the radiation part 220 that also extends along the X direction; the input pin 110, the shorting pin 130 and the input pin 210 all connects directly to the same side of the radiation part 120 or the radiation part 220 and extend along the Y direction perpendicular to the X direction (the negative Y direction in this drawing). The resonant unit 100 and the resonant unit 200 share the shorting pin 130, and the shorting pin 130 is further electrically coupled to the conductive plane 300. In the present embodiment, the conductive plane 300 is grounded.

The resonant unit 100 uses its own LC resonance structure to transmit an input signal SIN1 as a wireless signal SW1. The resonant unit 100 uses the input pin 110 to receive the input signal SIN1 and uses the radiation part 120 to transmit the wireless signal SW1. Similarly, the resonant unit 200 uses the input pin 210 to receive the input signal SIN1 and uses the radiation part 220 to transmit a wireless signal SW2. Because the resonant unit 100 and the resonant unit 200 are symmetrically disposed, the structures of the resonant unit 100 and the resonant unit 200 mirror each other, hence, the operating band of the resonant unit 100 and the operating band of the resonant unit 200 are substantially the same. In other words, the antenna structure 10 as a whole is a single-mode dual-feed point single antenna with only one operating band. In some embodiments, the operating band of the antenna structure 10 is approximately 220 MHz (2.38-2.60 GHz), wherein the operating band may be determined by the return loss of 10 dB.

As shown in FIG. 1, the input pin 110, the shorting pin 130, and the input pin 210 are arranged in parallel in sequence. Because the input pin 110 and the input pin 210 are symmetrically disposed, the two have substantially identical sizes and shapes, and the distance G1 between the input pin 110 and the shorting pin 130 is substantially equal to the distance G2 between the input pin 210 and the shorting pin 130. In view of the foregoing, the length L1 of the radiation part 120 is substantially equal to the length L2 of the radiation part 220. It is noted that the radiation part 120 and the radiation part 220 may be arranged in a straight line along the X direction or may deviate from the X direction and be bent or in other forms.

In certain embodiments, the distances G1 and G2 are approximately 1.9 mm; the lengths L1 and L2 are approximately 10.4 mm; the short side length H1 of the opening OP1 is approximately 9.3 mm; the long side length H2 of the opening OP1 is approximately 24 mm; the distance D1 (along the X direction) between the terminal of the radiation part 120 and the conductive plane 300 is approximately 1.6 mm; and the distance D2 (along the X direction) between the terminal of the radiation part 220 and the conductive plane 300 is approximately 1.6 mm.

Figure 2:
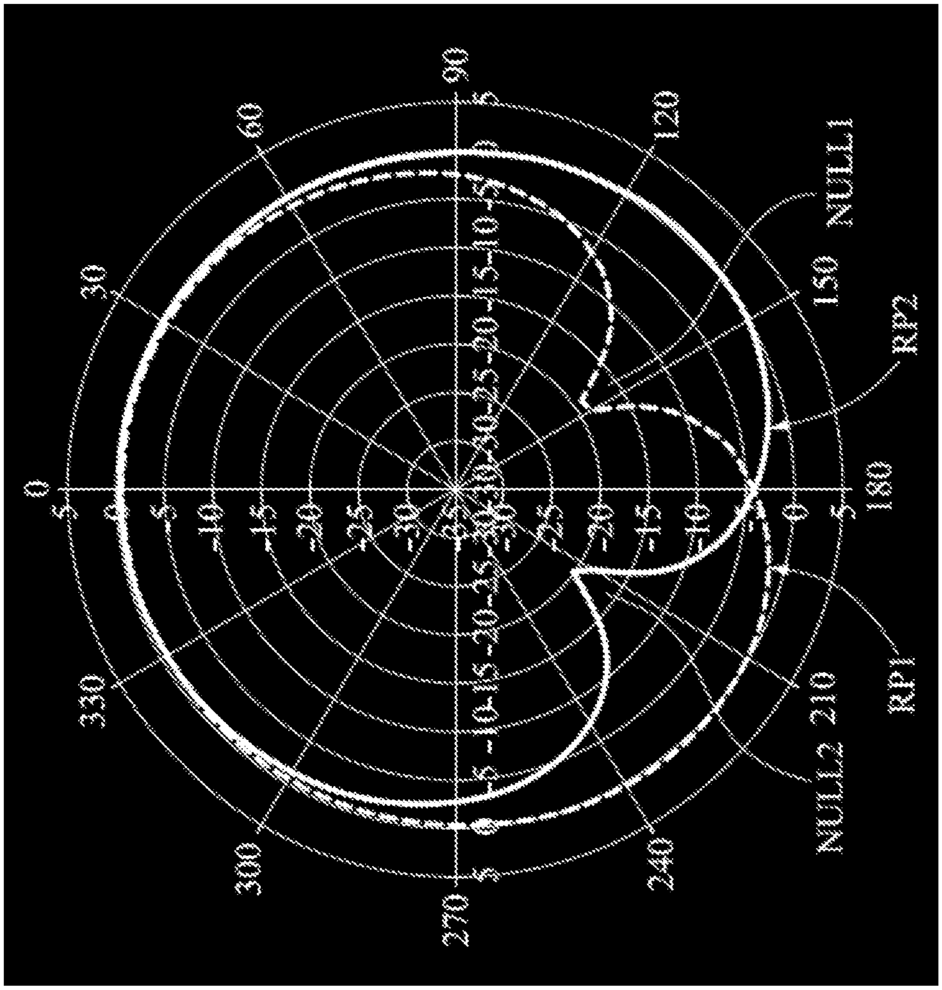
FIG. 2 is a schematic diagram illustrating a radiation pattern according to some embodiments of the present application antenna structure.

FIG. 2 is a schematic diagram illustrating the radiation pattern of the antenna structure 10 according to embodiments of the present application. The antenna structure 10 is configured to selectively transmit the input signal SIN1 as a wireless signal SW1 having a radiation pattern RP1 (shown in dashed lines) or a wireless signal SW2 having a radiation pattern RP2 (shown in solid lines).

Because the resonant unit 100 and the resonant unit 200 are symmetrically disposed, the radiation pattern RP1 and the radiation pattern RP2 are also symmetrical. As shown in FIG. 2, the radiation pattern RP1 and the radiation pattern RP2 are mirror-symmetrical along the line connecting 0° and 180°. The radiation pattern RP1 has a null NULL1 at around 145°, and the radiation pattern RP2 has a null NULL2 at around 215°.

When the antenna structure 10 uses the resonant unit 100 to transmit the wireless signal SW1, the input pin 210 is open i.e., the resonant unit 200 is idle. On the contrary, when the antenna structure 10 uses the resonant unit 200 to transmit the wireless signal SW2, the input pin 110 is open, and the resonant unit 100 is idle.

The null NULL1 and the null NULL2 are respectively the dead sectors of the resonant unit 100 and the resonant unit 200. By disposing the resonant unit 100 and the resonant unit 200 symmetrically, the null NULL1 of the radiation pattern RP1 is covered by a portion of the radiation pattern RP2 that does not contain the null, and the null NULL2 of the radiation pattern RP2 is covered by a portion of the radiation pattern RP1 that does not contain the null. In sum, the antenna structure 10 can switch between the radiation pattern RP1 and the radiation pattern RP2 to achieve omnidirectional transceiver capability.

Figure 3:
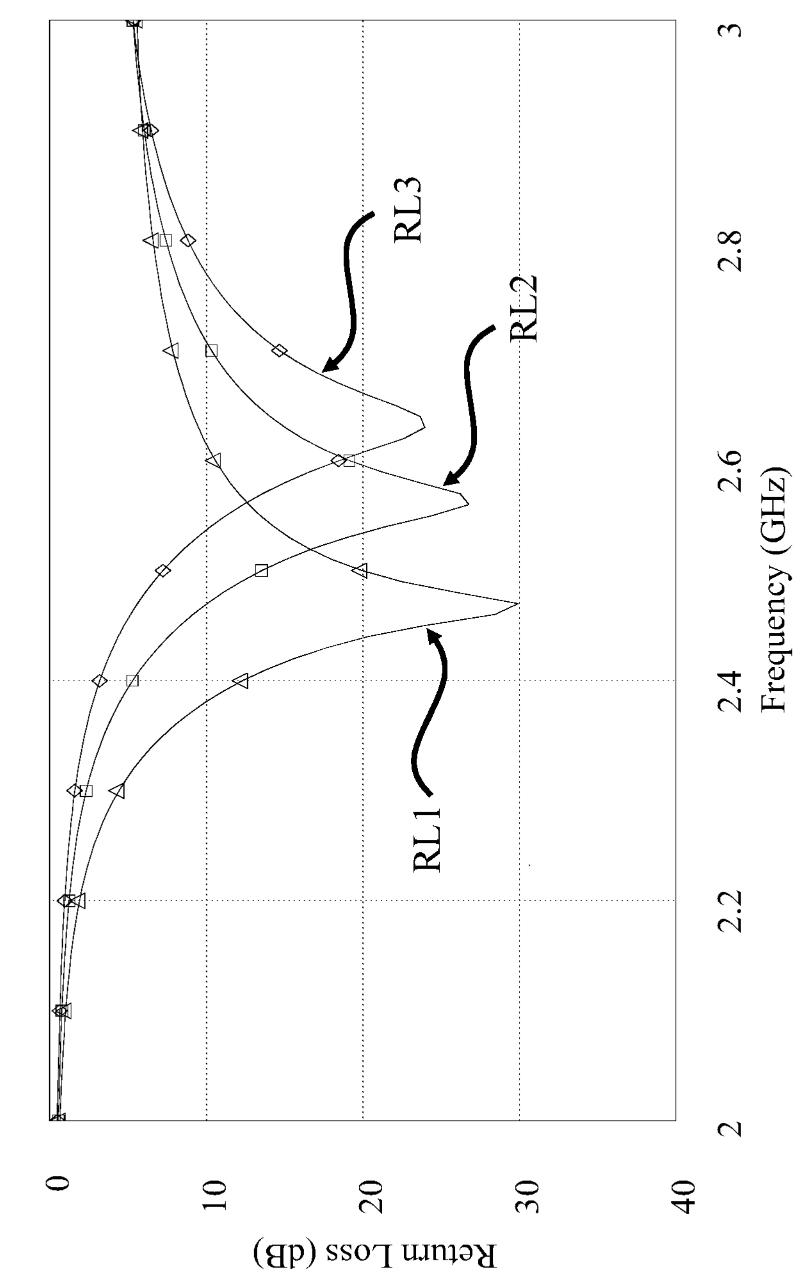
FIG. 3, FIG. 4 and FIG. 5 are schematic diagrams illustrating return loss of the antenna structure according to some embodiments of the present application.
Figure 4:
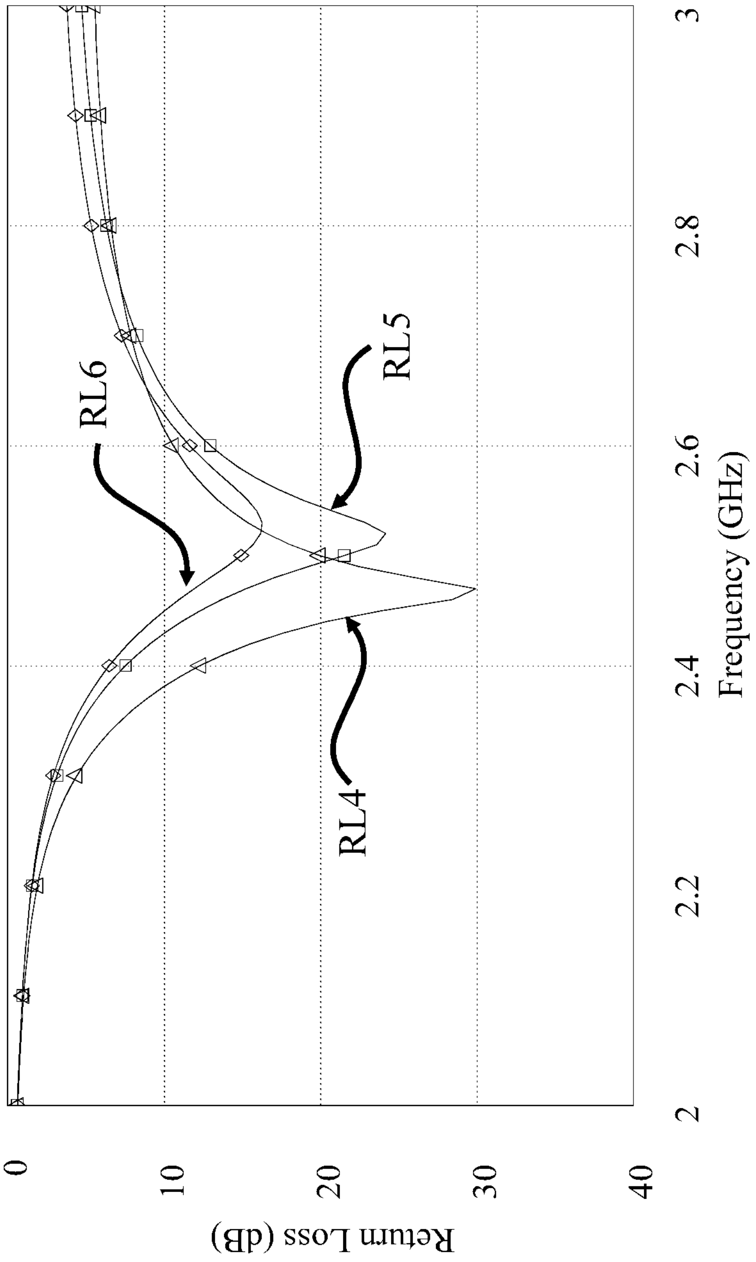
Figure 5:
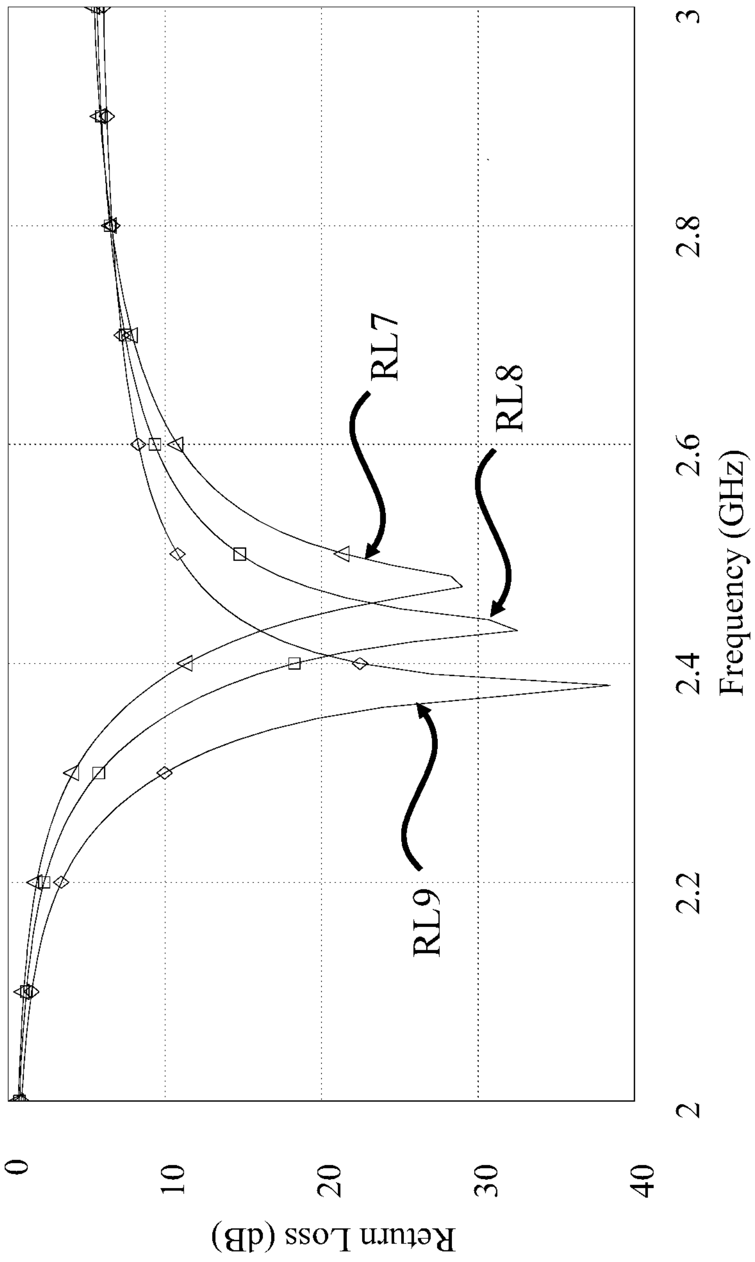

The above-mentioned arrangement of the antenna structure 10 is illustrative only, and various antenna structures 10 are also within the contemplated scope of the present application. For example, in various embodiments, the values of the length L1, length L2, distance G1, distance G2, distance D1 and distance D2 of the antenna structure 10 can be implemented using different values. Reference is made to FIG. 3, FIG. 4 and FIG. 5.

FIG. 3, FIG. 4 and FIG. 5 are schematic diagrams illustrating the return loss of the antenna structure 10 of the present application. In certain embodiments, when the length L1 of the radiation part 120 and the length L2 of the radiation part 220 are reduced from 10.4 mm to 9.9 mm and 9.4 mm, the return loss performance of the antenna structure 10 changes from curve RL1 to the curve RL2 and the curve RL3 (referring to FIG. 3). In view of the foregoing, when lengths L1 and L2 are shortened, the operating band of the antenna structure 10 moves toward higher frequency, and the return loss also increases accordingly. In certain embodiments, adjusting the lengths L1 and L2 can lead to the adjustment of the operating band of the antenna structure 10.

In certain embodiments, when the distance G1 between the input pin 110 and the shorting pin 130 and the distance G2 between the input pin 210 and the shorting pin 130 are reduced to 1.5 mm and 1.1 mm from 1.9 mm, the return loss performance of the antenna structure 10 changes from the curve RL4 to the curve RL5 and the curve RL6 (referring to FIG. 4). In view of the foregoing, when distances G1 and G2 are shortened, the operating band of the antenna structure 10 moves toward higher frequency, and the return loss also increases accordingly. In certain embodiments, adjusting the distances G1 and G2 can lead to the adjustment of the input impedance of the antenna structure 10.

In certain embodiments, when the distance D1 between the radiation part 120 and the conductive plane 300 and the distance D2 between the radiation part 220 and the conductive plane 300 are reduced to 1.4 mm and 1.2 mm from 1.6 mm, the return loss performance of the antenna structure 10 changes from the curve RL7 to the curve RL8 and the curve RL9 (referring to FIG. 5). In view of the foregoing, when distances D1 and D2 are shortened, the operating band of the antenna structure 10 moves toward lower frequency. In certain embodiments, adjusting the distances D1 and D2 can lead to the adjustment of the capacitance of the capacitive coupling of the antenna structure 10. When the capacitance of the capacitive coupling of the antenna structure 10 increases, the size of the antenna structure 10 can be reduced while maintain the identical operating band.

Figure 6:
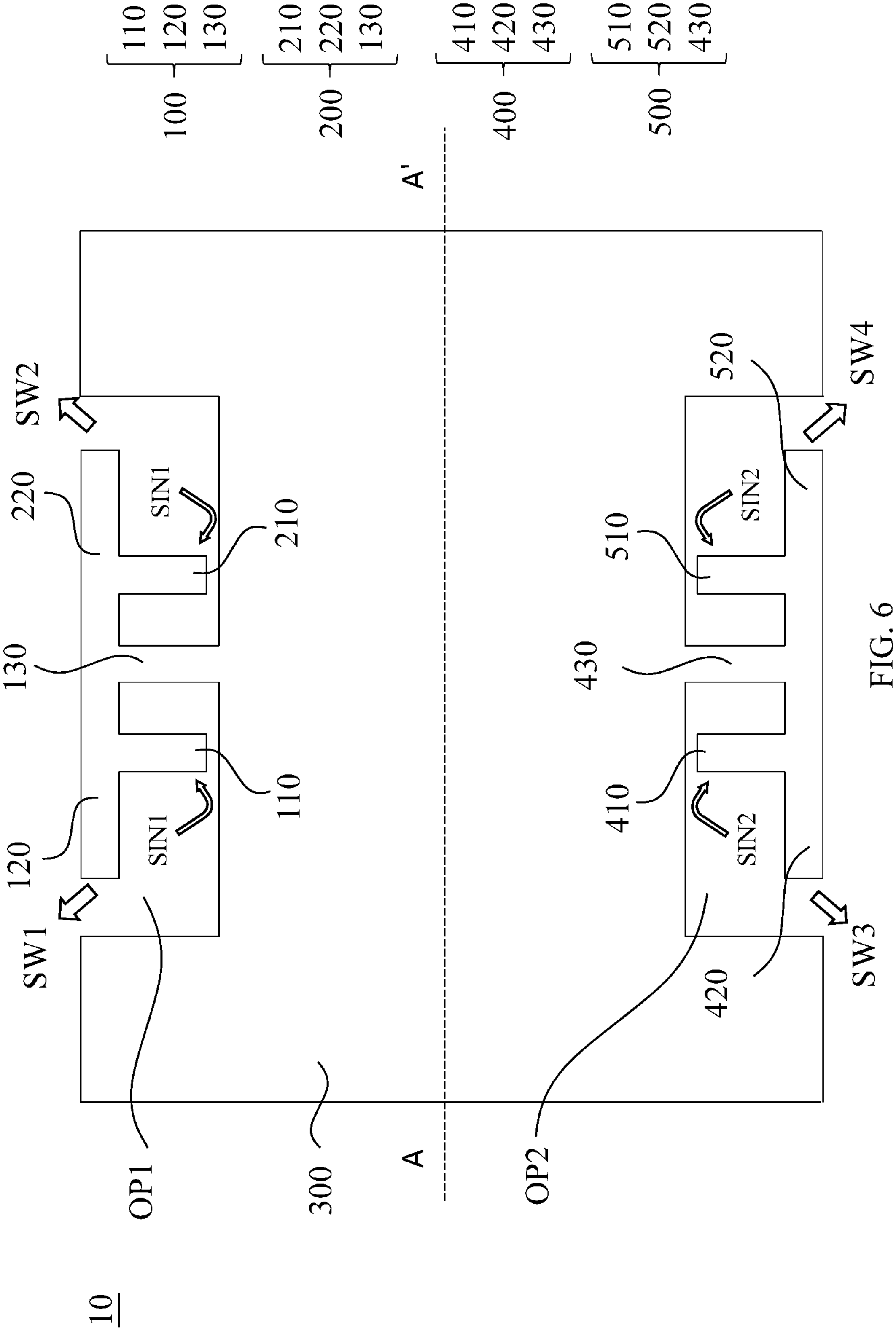
FIG. 6 and FIG. 7 are schematic diagrams illustrating the antenna structure according to other embodiment of the present application.

In certain embodiments, the antenna structure 10 further includes a resonant unit 400 and resonant unit 500. Reference is made to FIG. 6, which is a schematic diagram illustrating the antenna structure 10. The resonant unit 400 includes an input pin 410, a radiation part 420, and a shorting pin 430, and the resonant unit 500 includes an input pin 510, a radiation part 520, and a shorting pin 430, wherein the resonant unit 400 and the resonant unit 500 share the shorting pin 430. The shorting pin 430 is electrically coupled to the conductive plane 300. The conductive plane 300 further includes an opening OP2, wherein the resonant unit 400 and resonant unit 500 are disposed in the opening OP2. The resonant unit 400 is similar to the resonant unit 100, and resonant unit 500 is similar to the resonant unit 200. More specifically, the resonant unit 400 is the same as the resonant unit 100 and is mirror-symmetrical along the auxiliary line AA', and the resonant unit 500 is the same as the resonant unit 200 and is mirror-symmetrical along the auxiliary line AA'. In other words, the resonant unit 400 and resonant unit 500 are disposed at opposite sides of the antenna structure 10 with respect to the resonant unit 100 and the resonant unit 200.

The resonant unit 400 uses the input pin 410 to receive an input signal SIN2 and uses the radiation part 420 to transmit the wireless signal SW3. Similarly, the resonant unit 500 uses the input pin 510 to receive the input signal SIN2 and uses the radiation part 520 to transmit the wireless signal SW4. The operating band of the resonant unit 400 is substantially identical to the operating band of and resonant unit 500, and the radiation pattern RP3 of the wireless signal SW3 and the radiation pattern RP4 of the wireless signal SW4 are mirror-symmetrical. In certain embodiments, the input signal SIN1 and the input signal SIN2 are identical. When the resonant unit 400 transmits the wireless signal SW3, the resonant unit 500 is idle. When the resonant unit 500 transmits the wireless signal SW4, the resonant unit 400 is idle. However, the present application is not limited thereto.

Figure 7:
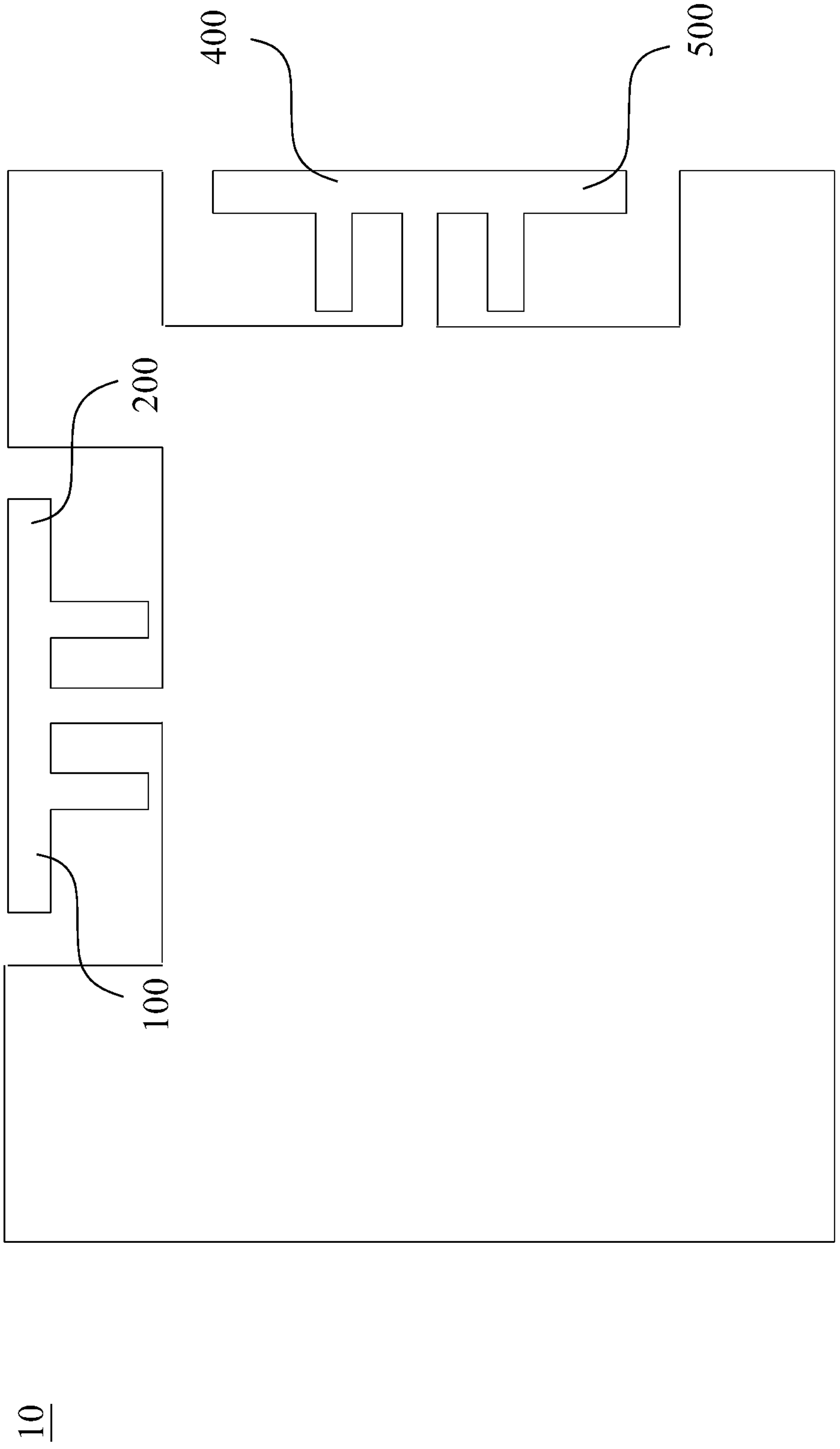

In some other embodiments, the resonant unit 400 and the resonant unit 500 are disposed at sides of the antenna structure 10 adjacent to the resonant unit 100 and the resonant unit 200. Reference is made to FIG. 7. The resonant unit 400 and the resonant unit 500 shown in FIG. 7 are similar to the resonant unit 400 and the resonant unit 500 shown in FIG. 6 with the exception of the arrangement position. Therefore, details of the resonant unit 400 and the resonant unit 500 are omitted herein.

Figure 8:
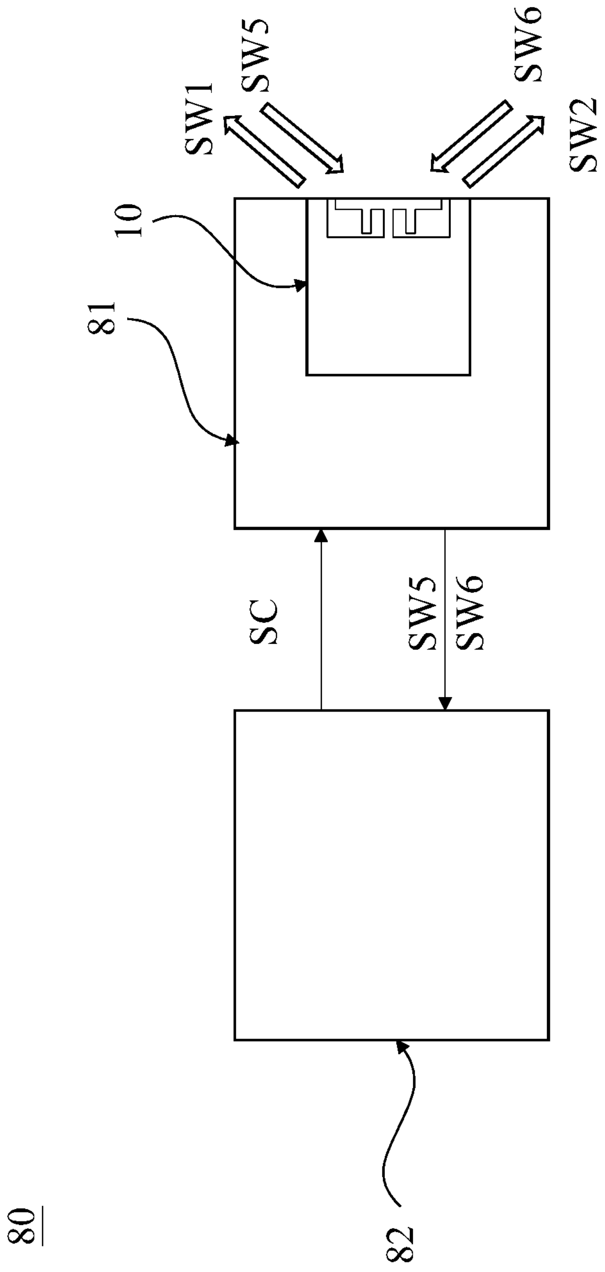
FIG. 8 and FIG. 9 is a schematic diagram illustrating a wireless communication device according to some embodiments of the present application.

Reference is made to FIG. 8. FIG. 8 is a schematic diagram illustrating a wireless communication device 80 according to some embodiments of the present application. The wireless communication device 80 includes a circuit substrate 81 and a processing circuit 82. In certain embodiments, the circuit substrate 81 may include the antenna structure 10 shown in FIG. 1, FIG. 6 or FIG. 7. For the sake of brevity, the antenna structure 10 shown in FIG. 1 is used to discuss the antenna structure 10 of the embodiment shown in FIG. 8.

In certain embodiments, when the antenna structure 10 transmits the wireless signal SW1 or SW2, the processing circuit 82 compares the throughputs of the resonant unit 100 and 200 (e.g., by comparing the transmission power of the two), and choose to use the resonant unit 100 or the resonant unit 200 having a higher throughput to transmit the wireless signal SW1 or the wireless signal SW2. The processing circuit 82 is configured to generate a control signal SC according to the throughputs of the resonant units 100 and 200. The processing circuit 82 is configured to transmit the control signal SC to the circuit substrate 81, so that the antenna structure 10 can switch to transmit the wireless signal SW1 or wireless signal SW2 according to control signal SC.

In certain embodiments, the antenna structure 10 is further configured to receive wireless signals SW5 and SW6 via resonant units 100 and 200, where the wireless signals SW5 and SW6 are substantially identical. For ease of understanding, the wireless signal received by the resonant unit 100 is called the wireless signal SW5, and the wireless signal received by the resonant unit 200 is called the wireless signal SW6. The processing circuit 82 is used to compare the received signal strength indicator (RSSI) between the received wireless signals SW5 and SW6. The processing circuit 82 generates a control signal SC to select the one with a higher RSSI as the resonant unit for receiving the signal, and to leave the other one idle.

Figure 9:
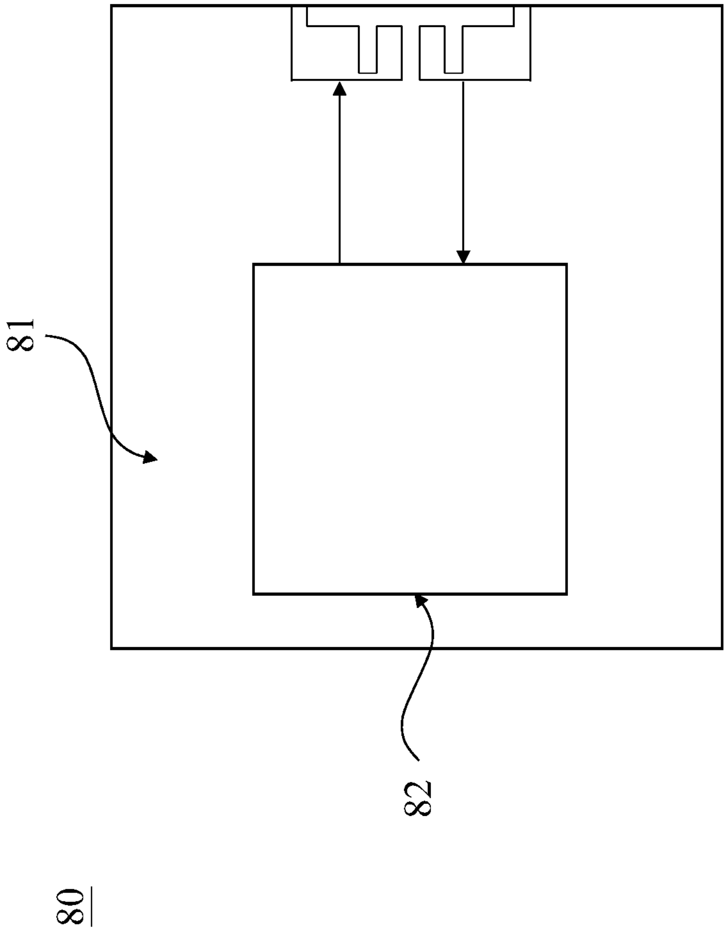

In certain embodiments, the processing circuit 82 is disposed in the circuit substrate 81, as shown in FIG. 9.

The antenna structure 10 and wireless communication device 80 provided by the present application utilize a planar single structure antenna with two input pins, which has the ability to generate a variety of radiation patterns and can switch to a resonant unit with better transceiver capacity to receive and transmit signals depending on the amount of energy of the transmitted/received wireless signal. In addition to not increasing the area occupied by the antenna, embodiments of the present application also have omnidirectional transceiver capability.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. An antenna structure, comprising:
- a first resonant unit, configured to transmit an input signal as a first wireless signal, comprising:
  - a first input pin, configured to receive the input signal;
  - a first radiating terminal, configured to transmit the first wireless signal; and
  - a shorting pin;
- a second resonant unit, configured to transmit the input signal as a second wireless signal; and
- a conductive plane, electrically coupled to the shorting pin,
- wherein the conductive plane has a first opening, wherein the first resonant unit and the second resonant unit are disposed in the first opening,
- wherein the first resonant unit and the second resonant unit have substantially identical operating bands, and the first resonant unit and the second resonant unit are a single continuous metal structure.

2. The antenna structure of claim 1, wherein the second resonant unit comprises:
- a second input pin, configured to receive the input signal; and
- a second radiating terminal, configured to transmit the second wireless signal.

3. The antenna structure of claim 2, wherein the first resonant unit and the second resonant unit share the shorting pin.

4. The antenna structure of claim 2, wherein the first input pin, the shorting pin, and the second input pin are disposed in parallel in sequence,
- wherein the first input pin and the shorting pin have a first pitch therebetween, and the shorting pin and the second input pin have a second pitch therebetween, wherein the first pitch is substantially equal to the second pitch.

5. The antenna structure of claim 1, wherein the conductive plane is grounded.

6. The antenna structure of claim 1, further comprising:
- a third first resonant unit, configured to transmit a second signal as a third wireless signal; and
- a fourth first resonant unit, configured to transmit the second signal as a fourth wireless signal, wherein the third wireless signal and the fourth wireless signal have substantially identical spectrum.

7. The antenna structure of claim 6, wherein the conductive plane further has a second opening, wherein the third first resonant unit and the fourth first resonant unit are disposed in the second opening, wherein the second opening and the first opening are disposed at opposite sides of the conductive plane.

8. The antenna structure of claim 6, wherein the conductive plane further has a second opening, wherein the third first resonant unit and the fourth first resonant unit are disposed in the second opening, wherein the second opening and the first opening are disposed at adjacent sides of the conductive plane.

9. The antenna structure of claim 1, wherein the first resonant unit and the second resonant unit are planar inverted-F antenna (PIFA) and are disposed symmetrically.

10. The antenna structure of claim 1, wherein when the first resonant unit transmits the first wireless signal, the second resonant unit is idle.

11. A wireless communication device, comprising:

a circuit substrate, comprising an antenna structure, wherein the antenna structure is configured to transmit an input signal as a first wireless signal or a second wireless signal, wherein a first radiation pattern of the first wireless signal and a second radiation pattern of the second wireless signal are mirror-symmetrical, and the antenna structure is a planar symmetrical structure and a single continuous metal structure, wherein the antenna structure is further configured to receive a third wireless signal or a fourth wireless signal, and switch between receiving the third wireless signal or the fourth wireless signal according to a receiving signal strength indicator of the third wireless signal and a receiving signal strength indicator of the fourth wireless signal.

12. The wireless communication device of claim 11, further comprising:

a processing circuit, configured to compare a transmission power of the first wireless signal and a transmission power of the second wireless signal to generate a control signal, wherein the antenna structure switch between transmitting the first wireless signal or the second wireless signal according to the control signal, wherein the processing circuit is further configured to compare the receiving signal strength indicator of the third wireless signal and the receiving signal strength indicator of the fourth wireless signal to generate the control signal, wherein the antenna structure selectively receives the third wireless signal or the fourth wireless signal according to the control signal.

13. The wireless communication device of claim 11, wherein the antenna structure comprising:

a first resonant unit; and a second resonant unit.

14. The wireless communication device of claim 13, wherein the first resonant unit comprises:

a first input pin, configured to receive the input signal;

a first radiating terminal, configured to transmit the first wireless signal; and a shorting pin, wherein the second resonant unit comprises:

a second input pin, configured to receive the input signal; and a second radiating terminal, configured to transmit the second wireless signal, wherein the first resonant unit and the second resonant unit share the shorting pin.

15. The wireless communication device of claim 14, wherein the antenna structure further comprises:

a conductive plane, electrically coupled to the shorting pin, wherein the conductive plane is grounded.

16. The wireless communication device of claim 11, wherein the antenna transmits the first wireless signal according to a first operating band and transmits the second wireless signal according to a second operating band, wherein the first operating band and the second operating band are substantially identical.

17. The wireless communication device of claim 11, wherein the circuit substrate is a printed circuit board.

* * * * *